May 17, 1927.
W. F. PFANDER
VEHICLE FRAME
Original Filed June 9, 1924    2 Sheets-Sheet 1
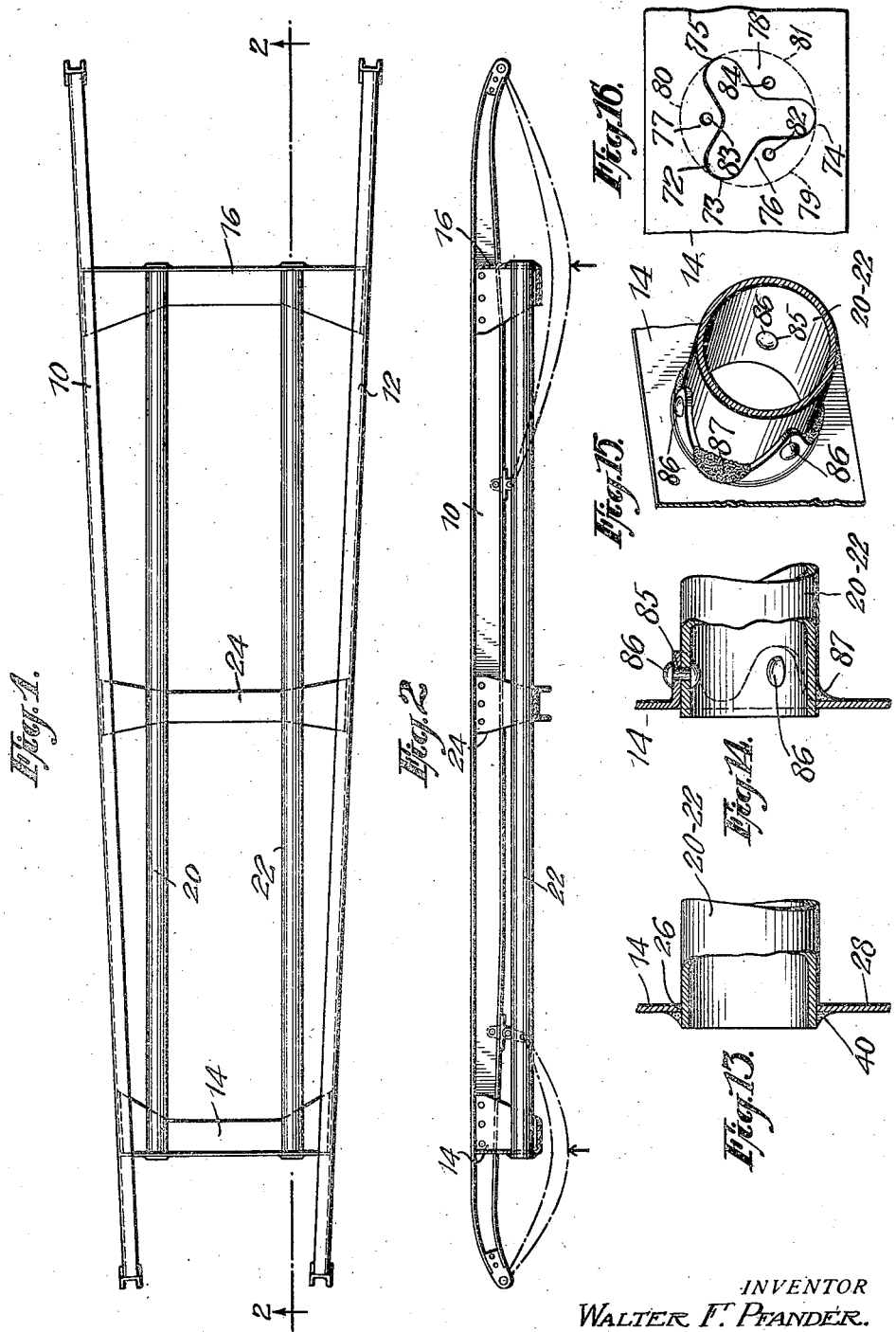
INVENTOR
WALTER F. PFANDER.
BY
Cornelius C. Billings
his ATTORNEY

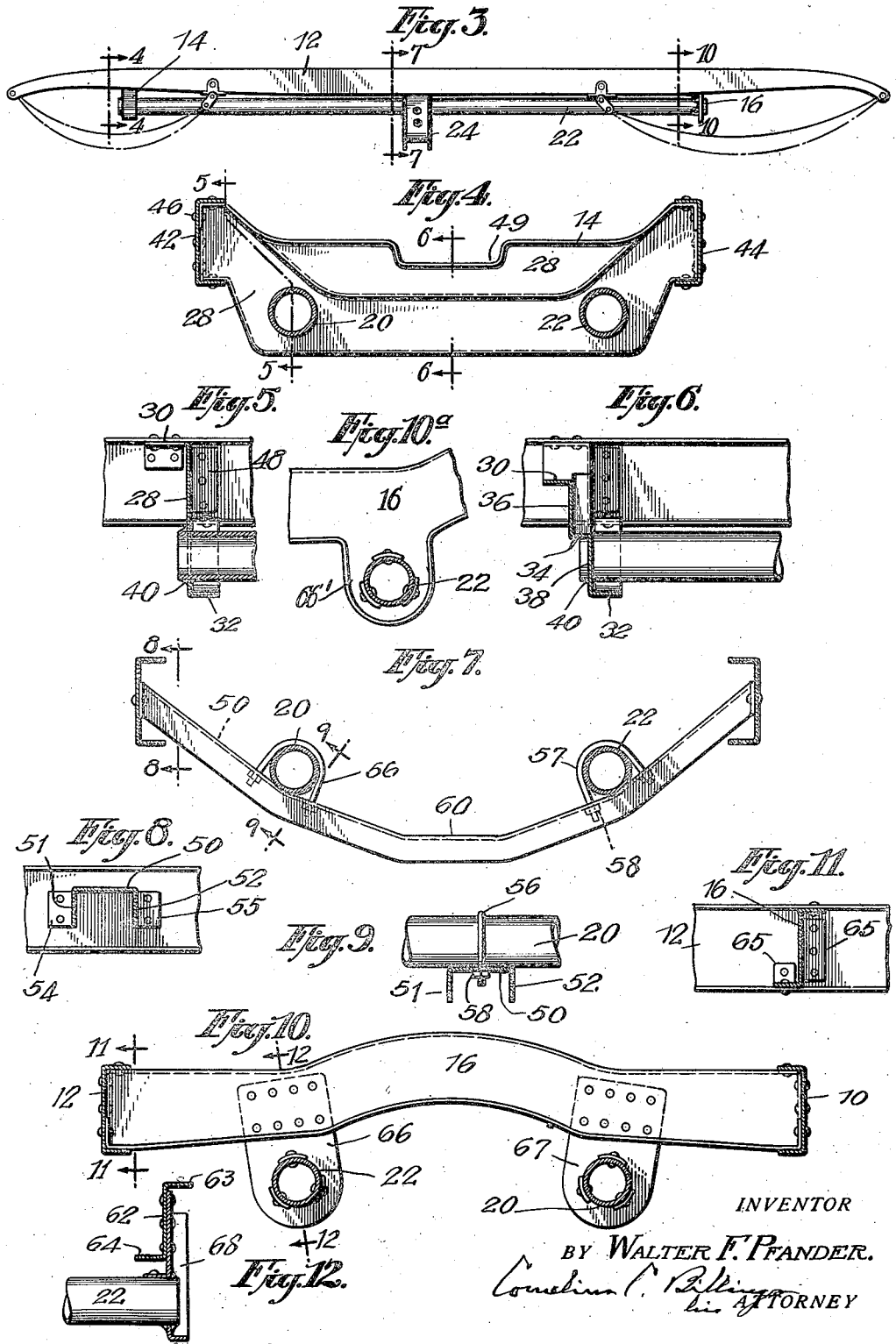

Patented May 17, 1927.

1,629,301

UNITED STATES PATENT OFFICE.

WALTER F. PFANDER, OF YONKERS, NEW YORK, ASSIGNOR TO WILLIAM C. DURANT, OF NEW YORK, N. Y.

VEHICLE FRAME.

Application filed June 9, 1924, Serial No. 718,748. Renewed January 22, 1927.

My invention relates to a vehicle frame and, more particularly to a frame construction which imparts additional strength and rigidity throughout substantially the length of the frame.

In the usual type of vehicle frames in which the frame is constructed of longitudinal and cross beams of channel or I form, the frame twists and weaves under the twisting or torsional stresses caused by the unevenness of the road over which the vehicle passes, due to the fact that the beams forming the frame cannot be designed nor arranged to resist these stresses without making them of a prohibitive size and weight. These defects or weaknesses in the usual frame construction have been largely obviated by the inventions described in the co-pending applications of Sturt and Pfander Serial No. 461,847 and of Pfander and Raviolo Serial No. 657,949 by the use of tubular, torsion resisting members positioned to extend through a portion of the frame and rigidly attached thereto so that, through their rigidity, the frame may be stiffened against torsional stresses throughout the corresponding portion of its length.

An object of the present invention is to provide a vehicle frame having a tubular, or torsion resisting member so secured thereto as to effectively stiffen the frame through substantially its entire length.

Further objects of the invention are, to provide a combined riveted and welded connection or joint between the frame members and the tubular torsion resisting members such that any weakening or failure of any one or more of the welds will not tend to weaken the remaining welds, with the result that the tubular torsion resisting members will be held in place even should one or more of the welds fail.

With these and other objects in view, as may be perceived from the following specification, the invention comprises the frame construction described and set forth in the following specification and claims.

The various features of the invention are illustrated in the accompanying drawings in which:

Fig. 1 is a diagrammatic plan view of a vehicle frame of a general or conventional type illustrating the invention.

Fig. 2 is a diagrammatic vertical sectional view of the frame taken on line 2—2 of Fig. 1, Fig. 3 is a side view of a frame embodying a preferred form of the invention, Fig. 4 is a cross sectional view of the frame taken on line 4—4 of Fig. 3, Fig. 5 is a detail sectional view taken on line 5—5 of Fig. 4, Fig. 6 is a detail sectional view taken on line 6—6 of Fig. 4, Fig. 7 is a cross sectional view taken on line 7—7 of Fig. 3, Fig. 8 is a detail sectional view taken on line 8—8 of Fig. 7, Fig. 9 is a detail sectional view taken on line 9—9 of Fig. 7, Fig. 10 is a cross sectional view taken on line 10—10 of Fig. 3, Fig. 10$^a$ is a fragmentary view of a modified construction of cross beam shown in Fig. 10, Fig. 11 is a detail sectional view taken on line 11—11 of Fig. 10.

Fig. 12 is a detail sectional view taken on line 12—12 of Fig. 10, parts in elevation, Fig. 13 is a detail view, partly in section, of the joint and weld between the tubular torsion resisting member and the frame, Fig. 14 is a similar view of a modified, and preferred, form of welded joint, Fig. 15 is a perspective view of the joint shown in Fig. 14, and, Fig. 16 is a view of a portion of the frame in which the end of the tubular torsion resisting member is to be inserted showing the manner of forming the opening into which the tubular member is to be inserted.

In my present invention the frame is formed of a pair of longitudinal side beams of the usual, or any suitable form, and connecting cross beams, the end cross beams being positioned at or approximately near the end of the frame or above the point of support of the frame on the wheel axle, and a tubular member or members are arranged lengthwise of the frame and rigidly joined to the end cross beams to positively resist the twisting or torsion of these beams on the tubular members. The end cross beams project below or have portions projecting below the lower edge of the side beams and the tubular members are so mounted and positioned thereon that their lower surfaces are below the lower edges of the side beams.

The tubular members are also rigidly supported by the frame intermediate its ends by means of a middle cross beam to which they are secured, the entire structure being thus formed into a single rigid beam structure which has a greater depth and consequently a greater beam value or resistance to bending forces, than the combined or added beam values of the side beams and tubular members acting separately.

Referring more particularly to the accompanying drawings, a frame embodying my invention comprises, a pair of longitudinal side beams 10 and 12 and a pair of end cross beams 14 and 16 connected to the side beams near their ends and preferably directly above the axles of the vehicle, the position of which is indicated by the arrows of Fig. 2, or midway between the attachment of the end springs to the side beams. The side and end beams may be of the usual channel or I form or other suitable construction and may be somewhat lighter than the usual type, owing to the beam strengthening effect of the torsion resisting member or members.

The cross beams project downwardly below the lower edge of the side beams, and a pair of tubular, torsion resisting members 20 and 22 extend between and through the end cross beams at a level below that of the side beams and are rigidly secured to the cross beams so that the cross beams can not turn or twist, even slightly, on the tubular members. As the tubular structure is particularly resistant to torsional stresses, a substantially rigid, non-twistable connection is thus provided between the end beams, even though relatively light, thin walled tubes are used and, by holding the end beams rigid in this manner, the entire frame is rendered rigid throughout its length, and is not distorted by any force or stress insufficient to break the rigid connection between the tubular members and end beams. A sufficiently rigid joint or connection between the end beams and the tubular members is obtained by welding the tubular members to the end beams. For this purpose gas welding is found effective and is recommended.

The tubular members, being continuous, also possess considerable strength as beams and are so mounted on the frame as to add their beam strength to that of the side beams 10 and 12. For this purpose they are supported by the side beams intermediate the end beams 14 and 16, and preferably midway of these end beams, by means of a middle cross beam 24 which is rigidly connected at its ends to the side beams 10 and 12. By means of this construction and arrangement, the side beams and the tubular members are united into a single beam structure, in which the side beams form the upper portion, and the tubular members form the lower portion thus giving a deeper beam structure, placing the metal where it is best adapted to resist bending stresses and providing a much stronger beam structure than would result from a mere addition of the beam values of the tubular members and side beams. The structure thereby provides a much stronger frame both as against bending loads and twisting stresses, and enables a frame of the required strength and rigidity to be constructed of lighter materials.

The form and arrangement of the side, cross and tubular members may be adapted to meet the requirements and conditions of the vehicle on which the frame is used and to provide mounting surfaces for the engine and other mechanism of the vehicle, a suitable form of embodiment being illustrated in Figs. 3 to 12, inclusive. In this embodiment, the front cross beam 14 is formed with a vertical web 28, an upper, forwardly extending flange 30, and a lower rearwardly extending flange 32, the middle portion of the web 28 being stepped forwardly to form a middle flange portion 34, and dividing the web into an upper portion 36 and a lower portion 38 and providing a maximum of stiffness and rigidity. The beam extends below the lower edge of the side beams 10 and 12 and below the tubular members 20 and 22 and the tubular members project through suitable openings in the lower portion 38 of the web and are secured therein by welding about their ends as at 40. The end portions of the upper flange 30 are bent to abut the upper flanges and side webs 42 and 44 of the side beams and are secured thereto by rivets 46, and the web 28 is also bent at its ends as at 48 and riveted to the vertical webs of the side beams. The lower flange 32 is also riveted to the lower flanges of the side beams. The central portion of the beam may be depressed as at 49 to permit the mounting thereon of a bearing for the cranking shaft.

The intermediate beam 24 is preferably of a channel shape in cross section, having an upper web 50 and a pair of side depending flanges 51 and 52 which are bent sidewise at their ends to form lugs 54 and 55 which are riveted to the side beams. The beam 24 is bent downwardly between the side beams to pass beneath the tubular members 20 and 22 and the tubular members are firmly secured to the beam by means of double ended bolts 56 and 57 which extend through and are secured to the upper web 50 by means of nuts 58. The central portion of the beam may be flattened as at 60 to provide a mounting surface for a transmission case.

The rear cross beam 16 is formed with a vertical web 62, a rearwardly extending upper flange 63 and a forwardly projecting lower flange 64 and is provided with suitable lugs 65 at its ends by which it is riveted to the side beams. Ordinarily it is not practicable nor desirable to extend this beam below the side beams as it would then interfere with the differential or other mechanism and the tubular members 20 and 22 are therefore mounted either in plates 66 and 67 riveted to the vertical web 62 and depending therefrom to the level of the tubular members as shown in Fig. 10, or to downwardly extending projections as at 66', which are integral with the cross beam itself, as shown in Fig. 10ª. The plates 66 and 67 or the projections 66' are thus firmly and rigidly joined to the cross beam and are stiffened by means of a flange 68 extending about their lower and side edges thus preventing bending or warping under the thrusts and tensions and torsions of the tubular members. With these constructions, the beam 16 may be so formed as to avoid interference with the mechanism beneath the body of the vehicle and to provide a strong and rigid support for the frame side rails while, at the same time permitting the tubular members to be positioned as low as desired.

While sufficient stiffening and strengthening might be obtained with the use of a single tubular torsional member a pair of such members are preferred, as by arranging them spaced apart and close to the side beams they are so positioned as to avoid the engine, transmission mechanism and other mechanism mounted beneath the frame, while providing a symmetrical strengthening effect. The tubular members, in addition to their functions of stiffening and strengthening the frame also serve as supports for the engine which may be mounted on and between the tubular members, and for other mechanism.

The tubular members may be joined to the end beams by various forms of welds or equivalent means, as for example, as shown in Figs. 5 and 6 in connection with the front cross beam 14 and in Fig. 13, by projecting the ends of the tubular members through an opening 26 in the vertical web 28 of the beam and building a weld 40 around the juncture of the tubular members and beam. The construction shown in Figs. 10, 12, 14, 15 and 16 is however preferred as it provides a stronger, cheaper, weld and one in which the tubular members would be secured to the end beams even though the bond between the weld and the beam should fail in whole or in part.

In forming this type of weld a clover shaped opening 72 is formed in the web of the beam, the outermost edges 73, 74 and 75 of the opening lying in a circle of the same diameter as the outer surface of the tubular member which is to be joined thereto. This form of opening also provides a number of tabs 76, 77 and 78 extending centrally inwardly from the edges 73, 74 and 75. The tabs 76, 77 and 78 are then bent on lines 79, 80 and 81 lying in the same circle as the edges 73, 74 and 75 and thus forming an opening into which the end portion of the tube 20 or 22 may fit and also forming a number of tabs lying closely against the outer surface of the tube. The tabs 76, 77 and 78 are also pierced with openings 82, 83 and 84, respectively, and the tube 20 or 22 with corresponding, aligned openings 85 and the tube is secured to the tabs by means of rivets 86 passing through these openings to form an additional securing means supplementing the welding of the tube to the cross beam.

In welding the tube to the cross beam, preferably a gas weld 87 is built on the edges 73, 74 and 75 filling the central portion of the space between the adjacent tabs. This weld not only unites the web of the cross beam to the surface of the tube but also builds on the surface of the tube a projection which closely fits the space between adjacent tabs and, in case the bond between one of these weld projections and the surface of the cross beam weakens or becomes loosened, the projection will hold the tube and beam against relative movement and the full torsional stress will not be thrown on the remaining bonds of the weld. Or, in case all of the bonds should become weakened or loosened, the torsional strengthening effect will not be entirely lost, since the close fitting of the projections of the welds with the spaces between the tabs will prevent any extensive movement therebetween. The rivets 86 serve to attach the tubes to the cross beams and retain the beam strengthening effect even though the welds should entirely fail. This manner of welding also is much less expensive than continuous welds.

As changes of construction could be made within the scope of my invention, it is intended that all matter contained in the above description or shown in the accompanying drawings be interpreted as illustrative and not in a limiting sense.

Having described the invention, what I claim and desire to secure by Letters Patent is:

1. A vehicle frame which comprises, a cross beam member having an opening and integral tabs expanding at right angles to the surface of said member, and tubular torsion resisting member projecting into and closely fitting within said opening and riveted to said tabs and welded to said member between said tabs.

2. A vehicle frame which comprises, a pair of side frames, a pair of end cross members, and a pair of tubular torsion resisting members secured to said end cross beams, said securing means comprising a cross beam member having an opening and tabs situated around the periphery thereof and lying against the face of said tubular member and riveted thereto and welds between said tabs.

3. A vehicle frame which comprises, a pair of side beams, a front cross beam, a pair of depending plates on said rear cross beam, and a pair of tubular torsion resisting members rigidly secured to said front cross beam and extending into openings in said depending plates, said depending plates having tabs lying against and riveted to said tubular members, said tubular members being welded to said depending plates between said tabs.

WALTER F. PFANDER.